(12) United States Patent
Martyn

(10) Patent No.: US 11,078,995 B2
(45) Date of Patent: Aug. 3, 2021

(54) APPARATUS FOR CONVERTING MOTION

(71) Applicant: Ten Fold Engineering Limited, Buckinghamshire (GB)

(72) Inventor: David Martyn, Wallingford (GB)

(73) Assignee: Ten Fold Engineering Limited

( * ) Notice: Subject to any disclaimer, the term of this patent is extended or adjusted under 35 U.S.C. 154(b) by 175 days.

(21) Appl. No.: 16/443,553

(22) Filed: Jun. 17, 2019

(65) Prior Publication Data

US 2019/0383366 A1 Dec. 19, 2019

(30) Foreign Application Priority Data

Jun. 18, 2018 (GB) ...................................... 1809980

(51) Int. Cl.
*F16H 21/02* (2006.01)
*F16H 21/04* (2006.01)
*F16H 21/40* (2006.01)
*F16H 21/44* (2006.01)

(52) U.S. Cl.
CPC ............. *F16H 21/02* (2013.01); *F16H 21/04* (2013.01); *F16H 21/40* (2013.01); *F16H 21/44* (2013.01)

(58) Field of Classification Search
CPC .......... F16H 21/02; F16H 21/04; F16H 21/40; F16H 21/44
See application file for complete search history.

(56) References Cited

U.S. PATENT DOCUMENTS 315,556 A * 4/1885 Salisbury ................. G05G 7/02
74/102
1,190,215 A 7/1916 Beckner
(Continued)

FOREIGN PATENT DOCUMENTS

CN 102678861 B 9/2012
GB 488626 A 7/1938
(Continued)

OTHER PUBLICATIONS

Patents Act 1977: Search Report under Section 17, GB Application No. 1809980.4, dated Dec. 6, 2018, 1 page.
(Continued)

*Primary Examiner* — Terence Boes
(74) *Attorney, Agent, or Firm* — Christopher McKeon; Jason Saunders; Arnold & Saunders, LLP

(57) ABSTRACT

An assembly for converting motion comprises a first arm rotatable about a first fixed pivot; a second arm rotatable about a second fixed pivot; a third arm pivotably connected to a second position on the second arm; a first connecting arm extending between the first and third arms; a second connecting arm extending between the first and second arms; a support arm extending from the connection between the second and third arms, the support arm linked to the connection between the first arm and the first connecting arm, wherein one of the connection between the second and third arms and the connection between the first arm and the first connecting arm is moveable relative to the support arm and the other of the connection between the second and third arms and the connection between the first arm and the first connecting arm is fixed relative to the support arm.

20 Claims, 13 Drawing Sheets

(56) References Cited

U.S. PATENT DOCUMENTS

| | | | |
|---|---|---|---|
| 1,240,370 A * | 9/1917 | Riener | F16H 21/04 74/521 |
| 2,506,151 A | 5/1950 | Hoven et al. | |
| 2,529,451 A | 11/1950 | Hoven et al. | |
| 4,248,103 A | 2/1981 | Halsall | |
| 4,400,985 A | 8/1983 | Bond | |
| 4,747,353 A | 5/1988 | Watt | |
| 5,102,290 A | 4/1992 | Cipolla | |
| 5,237,887 A | 8/1993 | Appleberry | |
| 9,528,579 B2 * | 12/2016 | Martyn | E04B 1/3444 |
| 2009/0212594 A1 * | 8/2009 | Breidenbach | B62D 35/004 296/180.1 |
| 2015/0122081 A1 * | 5/2015 | Martyn | F24S 30/48 74/99 R |
| 2016/0186842 A1 * | 6/2016 | Martyn | F16H 21/04 74/99 R |
| 2016/0195175 A1 * | 7/2016 | Martyn | F16H 21/04 74/99 R |
| 2017/0234413 A1 * | 8/2017 | Martyn | E04B 1/3441 74/99 R |
| 2017/0241523 A1 * | 8/2017 | Martyn | F16H 21/44 |
| 2018/0370585 A1 * | 12/2018 | Sawano | F16H 21/40 |
| 2019/0383367 A1 * | 12/2019 | Martyn | F16H 21/10 |
| 2019/0383368 A1 * | 12/2019 | Martyn | F16H 21/44 |

FOREIGN PATENT DOCUMENTS

| | | |
|---|---|---|
| GB | 2517920 A | 3/2015 |
| KR | 101883970 B1 | 8/2018 |
| WO | 9733725 A1 | 9/1997 |
| WO | 9914018 A1 | 3/1999 |
| WO | 2013182834 A1 | 12/2013 |
| WO | 2015033111 A1 | 3/2015 |

OTHER PUBLICATIONS

Dijksman, E.A., "True Strail-line Linkages Having a Rectilinear Translating Bar", Advances in Robot Kinematics and Computationed Geometry, pp. 411-420. 1994, Kluwer Academic Publishers.

Patents Act 1977: Search Report under Section 17, GB Application No. 1809975.4 dated Nov. 26, 2018, 1 page.

Patents Act 1977: Search Report under Section 17, GB Application No. 1809971.3, dated Nov. 26, 2018, 1 page.

* cited by examiner

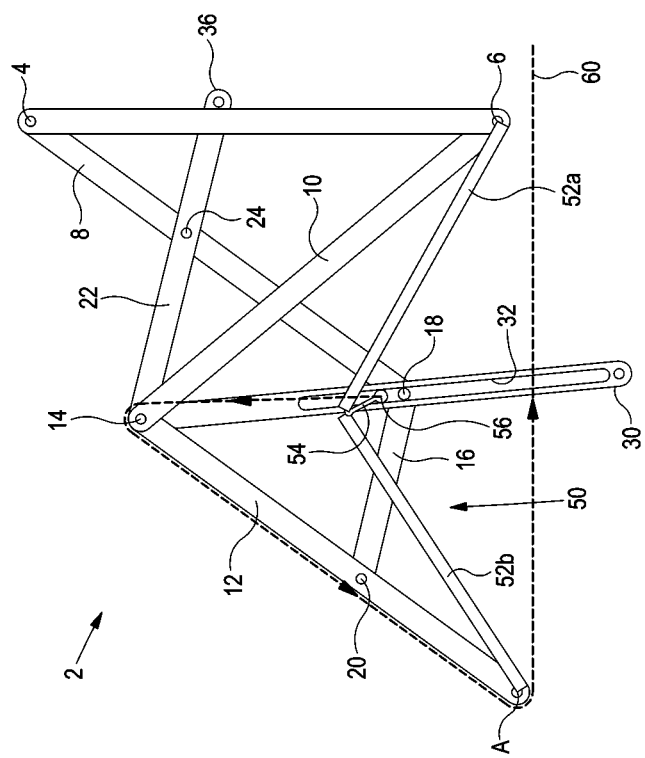

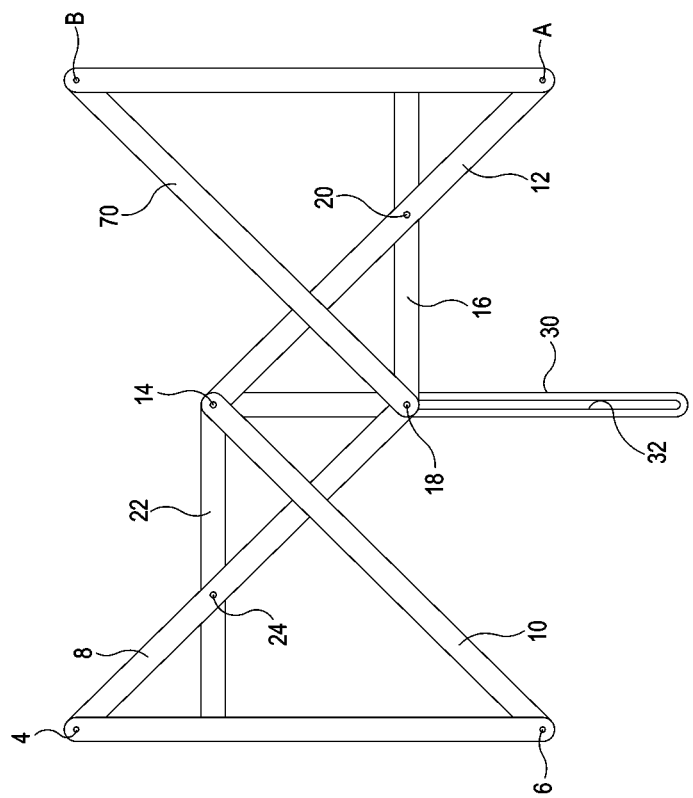

APPARATUS FOR CONVERTING MOTION

The present invention relates to an apparatus for converting motion. In one aspect, the apparatus may be used to producing a straight line motion, in particular an apparatus for producing motion of a component in a straight line generated by the rotational movement of a second component or the motion of the second component about a pivot. In a further aspect, the apparatus may be used to both displace and rotate a first component with respect to a second component.

Mechanisms for converting motion, in particular producing a straight line motion from a rotational motion are known in the art. Such straight line mechanisms may be characterised by comprising a first member rotatable about an axis passing through the member and a second member linked to or associated with the first member, the arrangement being such that rotational movement of the first member about the axis results in a straight line movement of the second member.

Examples of early mechanisms for producing a straight line motion include the straight line mechanism design by James Watt, comprising a series of three levers in end-to-end configuration, with movement of the two end levers about pivots at their free ends causing the middle lever to follow a close approximation to a straight line over a portion of its movement. A related linkage comprising three levers, with the middle lever constrained to follow a straight line was proposed by Tchebicheff. The Peaucellier-Lipkin inversor consists of an arrangement of seven levers and provides a conversion of circular motion into linear motion and vice versa. A related four-lever mechanism was proposed by Hart. A linear converter, known as the half beam mechanism, in which a first linear motion is converted to a second linear motion perpendicular to the first, was designed by Scott Russell.

An analysis of a variety of multi-lever, straight line linkages is provided by Dijksman, E. A. 'Advances in Robot Kinematics and Computationed Geometry', pages 411 to 420, [1994] Kluwer Academic Publishers.

U.S. Pat. No. 4,248,103 discloses a straight line mechanism, in particular a mechanism of the so-called 'conchoid' type. There is disclosed a linkage mechanism for an industrial manipulator comprising at least two of the said straight line mechanisms.

U.S. Pat. No. 4,400,985 concerns a straight line link mechanism, comprising a plurality of pivotally connected links. The links are connected between a support and a controlled member. As one of the links is moved in a 360° arc, the controlled member alternately moves in a first direction along a linear path and thereafter in the opposite direction along a curved path. The weight of the controlled member may be balanced by the use of a counter weight, to provide a lifting mechanism. A cam may be employed to control the motion of the controlled member.

More recently, U.S. Pat. No. 4,747,353 discloses a straight line motion mechanism formed from a pair linkage mechanisms arranged in a parallelogram in combination with a motion control means. The motion control means interconnects the two linkage mechanisms and provide a uniform angular displacement of each linkage mechanism.

U.S. Pat. No. 5,102,290 concerns a transfer device for transferring a workpiece from a first location to a second location. The workpiece is moved in a trochoidal arc by means of a pickup arm mounted to roll along a flat surface.

A straight line mechanism is disclosed in U.S. Pat. No. 5,237,887. The mechanism comprises a static base and a platform supported by first and second arm assemblies. Each of the first and second arm assemblies comprises portions pivotally connected to the static base. The arrangement of the pivoted arm portions of each arm assembly is such that the platform is constrained to move in a straight line, as the portions of the arms move about their respective pivot connections.

Still more recently, WO 97/33725 discloses a device for the relative movement of two elements. The device comprises at least two first links connected to a first element by a hinged connection so as to form a four-hinge system and pivot in a plane parallel to the plane of the first element. At least two second links are connected to the second element so as to form a four-hinge system and to pivot in a plane parallel to the plane of the second element. The two four-hinge systems provided by the first and second links are coupled in series to allow relative motion of the first and second elements.

WO 99/14018 discloses a device for the relative movement of two elements. The device comprises at least two link devices coupled between the elements, each comprising two mutually articulated link units. A first link unit is connected to first, moveable element. The second of the link units is connected to the second, static element. Power applied to the link units causes the first element to move relative to the second.

A mechanical linkage is described and shown in U.S. Pat. No. 2,506,151. The linkage comprises a plurality of interconnected levers. The linkage provides for movement of one member with respect to a fixed member. The linkage is specifically described and shown for use in providing movement for components of a chair, in particular to allow for movement of the seat of the chair in a rearwardly-downwardly and forwardly-upwardly direction. The linkage is indicated in U.S. Pat. No. 2,506,151 to provide for movement of the moveable member in a straight path with respect to the fixed member. A similar mechanical linkage is disclosed in U.S. Pat. No. 2,529,451.

An assembly for converting a rotary motion into a straight line motion has been found by the present inventors which relies upon an assembly of five levers or arms having pivoted connections therebetween. This assembly is the subject of WO 2013/182834. A further assembly of this kind is disclosed by the present inventors in WO 2015/033111.

There is a continuing need for an improved assembly for providing a straight line motion, in particular for providing an element moveable in a straight line in response to a rotational motion. It would be most advantageous if the assembly could be arranged to deploy a supporting member when being moved from a retracted position to an extended position.

According to the present invention, there is provided an assembly for converting motion, the assembly comprising:
a first arm rotatable at a first position thereon about a first fixed pivot;
a second arm rotatable at a first position thereon about a second fixed pivot, the second fixed pivot spaced apart from the first fixed pivot;
a third arm pivotably connected at a first position thereon to the second arm at a second position on the second arm, the second position spaced apart from the first position on the second arm;
a first connecting arm extending between the first arm and the third arm, the first connecting arm pivotably connected to a second position on the first arm spaced apart from the first position and pivotably connected to the third arm at a second position thereon spaced apart from the first position thereon;

a second connecting arm extending between the first arm and the second arm, the second connecting arm pivotably connected to a third position on the first arm disposed between the first and second positions thereon and pivotably connected to a third position on the second arm;

a support arm linked to the pivotable connection between the second arm and the third arm and extending from the pivotable connection between the second arm and the third arm, the support arm being linked to the pivotable connection between the first arm and the first connecting arm, wherein one of the pivotable connection between the second arm and the third arm and the pivotable connection between the first arm and the first connecting arm is moveable relative to the support arm and other of the pivotable connection between the second arm and the third arm and the pivotable connection between the first arm and the first connecting arm is fixed relative to the support arm.

In operation of the assembly, rotation of the first arm about the first fixed pivot results in rotation of the second arm about the second fixed pivot and movement of the third arm. In particular, the third arm is caused to move such that a point on the third arm (herein referred to as 'the said point') spaced from the first position on the third arm and located such that the second position on the third arm lies between the said point and the first position moves in a straight line. Thus, rotational motion of the first arm and the second arm about their respective fixed pivots results in a straight line motion of the said point on the third arm. In this respect, it is to be noted that the said point on the third arm referred to traces a line that is substantially straight, that is represents a very close approximation to a straight line. In particular, the path followed by the said point may be characterised as being a very flat sine wave, that is a sine wave of high wavelength and very low amplitude.

In operation, the assembly is mounted and moveable relative to the first and second fixed pivots. The first and second fixed pivots are provided by a suitable structure, such as a building or other component. The term 'fixed' when used with respect to the first and second fixed pivots indicates that the position of the first fixed pivot is fixed relative to the position of the second fixed pivot, such that the distance between the two pivots does not vary. Rather, the components of the assembly move relative to the positions of the two fixed pivots.

The assembly may be arranged in any suitable orientation. In many embodiments, the assembly is arranged with the first and second fixed pivots arranged vertically, with one above the other, in particular with the first fixed pivot above, preferably vertically above, the second fixed pivot.

The assembly of the present invention provides a number of significant advantages, shared with the assemblies of WO 2013/182834 and WO 2015/033111.

First, in preferred embodiments of the assembly, the said point on the third arm moves in a substantially straight line extending perpendicular to the line joining the first and second fixed pivots. This is a particularly advantageous arrangement, for example when employing the assembly in a building to provide movement of one portion of the building with respect to another, such as moving a portion of the building laterally from a fixed building structure.

Second, the assembly of the present invention may be arranged such that the arms of the assembly are accommodated one within the other in a very compact configuration, for example all lying between the first and second fixed pivots. This compactness is a significant advantage of the assembly of this invention.

Further, the said point on the third arm may be arranged to always be the forwardmost point of the assembly in the direction of motion of the said point. This arrangement provides significant advantages over known assemblies, where the point moving in a straight line is contained within or otherwise surrounded by other components of the assembly.

The assembly of the present invention provides additional advantages by way of the support arm. In particular, the support arm may be arranged to be moved or deployed as the assembly is moved to the extended position, in which the support arm provides support for the assembly and/or another component connected to and being moved by the assembly. It is particularly advantageous that the support arm is deployed simultaneously as the assembly is moved to the extended position. For example, the support arm may form or comprise part of a leg assembly that is deployed as the assembly is moved to the extended position, thereby allowing the assembly and any components or structure connected thereto to be supported automatically.

The point on the third arm referred to above is spaced from the first position on the third arm, with the second position on the third arm lying between the said point and the first position. The location of the said point will depend upon the length of the arms of the device and the positions of their interconnections. In one preferred embodiment, the said point is arranged to be at a distal location on the third arm, that is distal from the first and second positions on the third arm, preferably with the said point being located at the end of the third arm or in an end portion at the end of the arm.

The extent of the straight line motion of the said point on the third arm varies according the precise positioning of the connections between the arms. For example, in one embodiment, it has been found that this close approximation to a straight line motion by the said point on the third arm occurs over a distance that is up to 85% of the distance between the first and second fixed pivots. Further embodiments provide motion of the said point on the third arm that follows a close approximation to a straight line for a distance up to or exceeding 100% of the distance between the first and second fixed pivots. References herein to a motion of the said point on the third arm in a 'straight line' are references to this movement.

The arrangement of the assembly of the present invention may be varied depending upon the requirements. For example, the assembly may be arranged to provide a longer straight line movement of the said point on the third arm with a slightly greater deviation from a straight line. Alternatively, the assembly may be arranged to provide a shorter straight line movement of the said point, with the path traced by the said point being a closer approximation to a straight line with less deviation.

When moving between the retracted and the extended positions, the said point on the third arm follows a substantially straight line. Other points on the third arm follow a respective arc.

The point of the assembly that traces a straight line moves away from the mechanism, that is leads the mechanism in the direction of motion of the said point. As noted, the assembly may be considered to be movable from a retracted position to an extended position, with a point on the third arm moving in a straight line between the retracted and extended positions. The point on the third arm moves in a straight line away from the retracted position to the extended position. In many preferred embodiments, the said point on the third arm is provided as the distal-most point on the arm. In this way, an object or component to be moved relative to the first and second fixed pivots may be mounted to an end or endmost portion of the assembly furthest from the fixed pivots in the extended position.

In particular, the assembly is such that, in operation, a point on the third arm traces a straight line that extends away from the first and second fixed pivot points, in particular from the line joining the first and second pivot points. More particularly, in many embodiments, the straight line path followed by the said point on the third arm extends perpendicular to the line joining the first and second pivot points. This is an advantage over assemblies of the prior art and allows the assembly of the present invention to be more versatile and have a wider range of applications. In particular, it allows the assembly to be placed or mounted on a plane and to have all motion of the components confined to one side of the plane. Thus, for example, the assembly may be used on an exterior surface of a construction, such as a building or the like, and all components move from the retracted to the extended positions on the exterior, without encroaching on or requiring space on the interior side of the plane.

Further, the arms of the assembly may be constructed such that the arms may be accommodated one within another. The components of the assembly may be arranged such that, when in the retracted position, the third arm and first and second connecting arms are accommodated within or adjacent the first and second arms, thereby providing for a particularly compact assembly when in the retracted position.

The assembly has been defined hereinbefore by reference to a plurality of arms. It is to be understood that the term 'arm' is used as a general reference to any component that may be connected as hereinbefore described and/or moved about a fixed pivot. Accordingly, the term 'arm' is to be understood as being a reference to any such component, regardless of shape or configuration.

As noted above, the assembly of the present invention provides a motion of the said point on the third arm that follows a straight line over a specific extent of its movement. The close approximation of the movement of the said point on the third arm to a straight line between the retracted and extended positions makes the assembly of the present invention particularly useful as a straight line converter, that is able to convert a rotational movement of the first and/or second arms about the first and second fixed pivots respectively, into a straight line motion of the said point on the third arm. The operation of the assembly is not limited to this extent of movement of the third arm. Rather, continued movement of the assembly beyond the extended position to a super-extended position causes the said point on the third arm to move in an arc.

In many embodiments, it is particularly preferred that movement of the assembly is limited to movement between the retracted position and the extended position, with the said point on the third arm moving along a straight line path. One or more means, such as a restraining assembly or a locking assembly, may be provided to limit the movement of the assembly and prevent movement past the extended position.

As noted, operation of the assembly results in motion of the third arm. It is to be understood that the assembly may be used to convert a rotational motion of the first or second arms about the first or second fixed pivots into a motion of the said point on the third arm, that is by having drive to the assembly provided at the first or second arms. Alternatively, the assembly may be used to convert a motion of the third arm into a rotational motion of the first and second arms, that is by having drive to the assembly applied at the third arm.

As described in more detail below, the assembly of the present invention is fixed in use to a first fixed pivot and a second fixed pivot. In this respect, the term 'fixed pivot' is a reference to a pivot that has its position fixed, with respect to the arms of the assembly and any component attached or mounted to the arms, which are moveable relative to the fixed pivot. The first and second fixed pivots are provided by a structure or component and are points at which the assembly is mounted to the structure or component.

The first and second fixed pivots have their positions fixed relative to each other, that is the position of the first fixed pivot is fixed relative to the position of the second fixed pivot.

The first and second fixed pivots may be arranged in any orientation, relative to one another, as determined by the action required of the assembly. The first and second fixed pivots lie on a straight line. In many embodiments, the first and second fixed pivots are arranged on a vertical straight line.

In operation of the assembly, the arms of the assembly can be arranged to move in a plane containing the line joining the first and second fixed pivots. This is particularly advantageous.

In addition, the arms of the assembly can be arranged to lie and move to one side only of the line joining the first and second fixed pivots. Again, this is particularly advantageous in many embodiments, as it allows the assembly to be mounted and operate on just one side of the first and second fixed pivots, without encroaching on the space on the opposing side of the first and second fixed pivots.

The assembly of the present invention comprises a first arm. The first arm may have any shape and configuration. A preferred form for the first arm is an elongate member, for example a bar or a rod. The first arm is pivotably mounted at a first position on the arm to a first fixed pivot. The pivotable connection at the first position may be of any suitable form, preferably a pin, spindle or axle passing through the arm about which the arm is free to move. The first position may be in any suitable location on the arm. In one preferred embodiment, the first position is at or adjacent one end of the arm.

The first arm may function as a driving arm for the assembly, that is have a force applied thereto so as to rotate the arm about the fixed pivot at the first position on the arm, thereby transferring drive to the other components of the assembly. Alternatively, the first arm may be a driven arm of the assembly, that is move about the fixed pivot under the action of the other components of the assembly. The assembly of the present invention is particularly advantageous when the first arm operates as a driving arm.

The first position on the first arm may be at any suitable location thereon. In one preferred embodiment, the first position is at or adjacent the first end of the first arm.

The assembly further comprises a second arm. The second arm may have any shape and configuration. A preferred form for the second arm is an elongate member, for example a bar or a rod. The second arm is pivotably mounted at a first position on the second arm to a second fixed pivot. The pivotable connection at the first position may be of any suitable form, preferably a pin, spindle or axle passing through the arm about which the arm is free to move. The first position may be in any suitable location on the second arm. In one preferred embodiment, the first position is at or adjacent one end of the second arm.

The second arm is moved about the second fixed pivot under the action of either movement of the first arm or the third arm.

The second arm may function as a driving arm for the assembly, that is have a force applied thereto so as to rotate the arm about the fixed pivot at the first position on the arm, thereby transferring drive to the other components of the assembly. Alternatively, the second arm may be a driven arm of the assembly, that is move about the fixed pivot under the action of the other components of the assembly. The assembly of the present invention is particularly advantageous when the second arm operates as a driving arm.

The assembly further comprises a third arm. The third arm may have any shape and configuration. A preferred form for the third arm is an elongate member, for example a bar or a rod. The third arm is pivotably mounted at a first position on the third arm to the second arm. The pivotable connection between the second and third arms may be of any suitable form, preferably a pin, spindle or axle passing through the arms about which one or both of the arms are free to move.

The third arm is pivotably connected to the second arm at a first position on the third arm and a second position on the second arm. The first position may be in any suitable location on the third arm. In one preferred embodiment, the first position is at or adjacent one end of the third arm.

The second position on the second arm is spaced apart from the first position on the second arm. In one preferred embodiment, the second position on the second arm is at or adjacent the second end of the second arm.

In operation of the assembly, as noted above, the third arm has a point thereon that follows the path of a straight line when the assembly is moved between the retracted and extended positions. This point on the third arm is spaced apart from the first position on the third arm, that is the position on the third arm at which the second and third arms are pivotably connected together. The third arm may be a driven arm, that is moved under the action of movement of the first and second arms. In this case, rotation of the first arm about the first fixed pivot causes the third arm to move, such that the said point on the third arm follows the straight line path between the retracted and extended positions. Alternatively, the third arm may be a driving arm, that is have a force applied thereto resulting in movement of the third arm, which in turn drives the other components of the assembly to result in movement of the first arm about the first fixed pivot. For example, application of a straight line force to the said point on the third arm between the retracted and extended positions results in rotational movement of the first arm about the first fixed pivot.

The distance between the first and second fixed pivots and the lengths of the first, second and third arms may be selected according to the desired movement of the components to be achieved and the particular application of the assembly.

However, generally, the ratio of the length of the first arm, that is the distance between the first and second positions on the first arm, to the distance between the first and second fixed pivots may range from 0.5 to 2.0, more preferably from 0.6 to 1.75, still more preferably from 0.75 to 1.5. The first arm is preferably no longer than, more preferably shorter in length than the distance between the first and second fixed pivots. The ratio of the length of the first arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The ratio of the length of the second arm, that is the distance between the first and second positions on the second arm, to the distance between the first and second fixed pivots may range from 0.5 to 2.0, more preferably from 0.6 to 1.75, still more preferably from 0.75 to 1.5. The second arm is preferably shorter in length than the distance between the first and second fixed pivots. The ratio of the length of the second arm to the distance between the first and second fixed pivots is therefore more preferably from 0.75 to 0.99, still more preferably from 0.8 to 0.99, in particular from 0.9 to 0.99. A ratio of about 0.92 to about 0.98 is particularly suitable for many applications.

The length of the second arm is preferably selected to be as long as possible, within the constraints of the other components of the assembly and the desired motion. In this way, the arc through which the second position on the second arm moves about the second fixed pivot has as large a radius as possible. This facilitates the positioning of the second connecting arm.

The second arm may be longer or shorter than the first arm. In one preferred embodiment, the first and second arms are of the same length.

Taking the length of the third arm to be the distance between the first position on the third arm and the said point on the third arm, the length of the third arm will be determined by the arrangement of the first and second arms, together with the connecting arms. In some embodiments, the length of the third arm is less than that of the first and second arms, in particular from 0.9 to 0.99 of the length of the first and/or second arms. For example, with the first and second arms being of equal length and less than the distance between the first and second fixed pivots, the third arm has a length of about 0.975. In alternative embodiments, the length of the third arm is the same as that of the first arm and/or the second arm.

In one particularly preferred arrangement, the first, second and third arms are the same length.

The assembly further comprises a first connecting arm. The first connecting arm extends between the first arm and the third arm. The first connecting arm may have any shape and configuration. A preferred form for the first connecting arm is an elongate member, for example a bar or a rod. The first connecting arm is pivotably mounted to each of the first and third arms. The pivotable connections between the first connecting arm and each of the first and third arms may be of any suitable form, preferably a pin, spindle or axle passing through the arms about which one or both of the arms are free to move.

The pivotable connections may be at any suitable location on the first connecting arm. In one preferred embodiment, the pivotable connection between the first connecting arm and the first arm is at or adjacent one end of the first connecting arm and/or the pivotable connection between the first connecting arm and the third arm is at or adjacent the second end of the first connecting arm.

The first connecting arm is connected to the first arm at a second position on the first arm. The second position on the first arm is spaced apart from the first position on the first arm. In one preferred embodiment, the second position on the first arm is at or adjacent the second end of the first arm.

The first connecting arm is further connected to the third arm at a second position on the third arm, which second position is spaced apart from the first position on the third arm.

The first connecting arm may have any suitable length. The length of the first connecting arm may be confined to the distance between the positions on the first and third arms between which the first connecting arm extends. Alternatively, the first connecting arm may extend beyond either one or both of the first and third arms, for example to provide additional support, in particular when the assembly is in the extended position, and/or to provide a locking action to limit movement of the assembly. For example, the first connecting arm may extend beyond either one or both of the first and third arms, with an extended portion locking with another arm and/or a fixed component, thereby locking the assembly in the extended position and providing additional rigidity to the structure.

The second position on the third arm, at which the first connecting arm is connected, may be selected according to a number of factors. First, the first connecting arm acts to provide support for the third arm, in particular to assist in supporting any load applied to the third arm. The requirement for the third arm to be supported in this manner by the first connecting arm is a factor in determining the location of the second position on the third arm. Second, the overall strength and stability of the assembly is related to the length of the first connecting arm, with the strength and stability reducing as the length of the first connecting arm increases.

The second position on the third arm may be at any suitable position. In particular, the ratio of the distance between the first position and the second position on the third arm and the distance between the first position and the said point on the third arm may be from 0.1 to 0.9, more preferably from 0.2 to 0.8, still more preferably from 0.3 to 0.7, in particular from 0.35 to 0.6. A preferred ratio is from 0.4 to 0.55. The ratio of the distance between the first position and the second position on the third arm and the distance between the first position and the said point on the third arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the second position on the third arm and the distance between the first position and the said point on the third arm about 0.41 to about 0.47.

The assembly further comprises a second connecting arm. The second connecting arm extends between the first arm and the second arm. The second connecting arm may have any shape and configuration. A preferred form for the second connecting arm is an elongate member, for example a bar or a rod. The second connecting arm is pivotably mounted to each of the first and second arms. The pivotable connections between the second connecting arm and each of the first and second arms may be of any suitable form, preferably a pin, spindle or axle passing through the arms about which one or both of the arms are free to move.

The pivotable connections may be at any suitable location on the second connecting arm. In one preferred embodiment, the pivotable connection between the second connecting arm and the first arm is at or adjacent one end of the second connecting arm and/or the pivotable connection between the second connecting arm and the second arm is at or adjacent the second end of the second connecting arm.

The second connecting arm is connected to the first arm at a third position on the first arm, which third position is spaced apart from and between both the first and second positions on the first arm.

The second connecting arm may have any suitable length. The length of the second connecting arm may be confined to the distance between the positions on the first and second arms between which the first connecting arm extends. Alternatively, the second connecting arm may extend beyond either one or both of the first and second arms, for example to provide additional support, in particular when the assembly is in the extended position, and/or to provide a locking action to limit movement of the assembly. For example, the second connecting arm may extend beyond either one or both of the first and second arms, with an extended portion locking with another arm and/or a fixed component, thereby locking the assembly in the extended position and providing additional rigidity to the structure.

The third position on the first arm, at which the second connecting arm is connected, may be selected according to a number of factors. First, the second connecting arm acts to provide support for the first arm, in particular to assist in supporting any load applied to the first arm. The requirement for the first arm to be supported in this manner by the first connecting arm is a factor in determining the location of the third position on the first arm. Second, as with the first connecting arm, the overall strength and stability of the assembly is related to the length of the second connecting arm, with the strength and stability reducing as the length of the second connecting arm increases.

The third position on the first arm may be at any suitable position. In particular, the ratio of the distance between the first position and the third position on the first arm and the distance between the first position and the second position on the first arm may be from 0.1 to 0.9, more preferably from 0.2 to 0.8, still more preferably from 0.3 to 0.7, in particular from 0.4 to 0.6. A preferred ratio is from 0.4 to 0.55. The ratio of the distance between the first position and the third position on the first arm and the distance between the first position and the second position on the first arm is preferably less than 0.75, more preferably less than 0.65, more preferably less than 0.55. A ratio of up to 0.5 has been found to be particularly suitable. One particularly preferred embodiment of the assembly has the ratio of the distance between the first position and the third position on the first arm and the distance between the first position and the second position on the first arm about 0.4 to 0.5.

The second connecting arm is further connected to the second arm at a third position on the second arm. In one embodiment of the assembly, the third position is spaced apart from and between the first and second positions on the second arm. In an alternative embodiment, the third position on the second arm coincides with the second position on the second arm, such that the second connecting arm is connected to both the second and third arms. This arrangement has the advantage of being particularly compact and is especially preferred.

The third position on the second arm is at or spaced from the second position on the second arm and may be at any suitable position. In particular, the ratio of the distance between the first position and the third position on the second arm and the distance between the first position and the second position on the second arm may be from 0.8 to 1.0, more preferably from 0.85 to 1.0, still more preferably from 0.875 to 1.0, in particular from 0.9 to 1.0. A preferred ratio is from 0.925 to 1.0. One particularly preferred embodiment of the assembly has the ratio of the distance between the first position and the third position on the second arm and the distance between the first position and the second position on the second arm about 0.95 to 1.0.

The assembly of the present invention further comprises a support arm. The support arm may have any shape and configuration. A preferred form for the support arm is an elongate member, for example a bar or a rod.

The support arm is linked to the pivotable connection between the second arm and the third arm and extends from the pivotable connection between the second arm and the third arm.

The term 'linked' as used herein is a reference to the type of connection between the support arm and the connection between the second arm and the third arm. In particular, the term 'linked' refers to a first type of connection in which the connection between the second arm and the third arm is fixed in relation to the support arm. The term 'linked' also refers to a second type of connection, in which the connection between the second arm and the third arm is moveable relative to the support arm as the assembly moves between the retracted and extended positions, whereby the movement of the support arm about the pivotable connection between the first arm and the first connecting arm is constrained and controlled by the connection between the support arm and the connection between the second arm and the third arm.

In one embodiment, in which the connection between the second arm and the third arm is moveable, the support arm is linked to the connection between the second arm and the third arm such that the second and third arms both pivot in relation to the support arm and the connection moves along a line substantially parallel to the longitudinal axis of the support arm. The support arm may be linked to the connection between the second arm and the third arm by a linkage assembly, for example comprising one or more arms or levers, pivotably connected to the support arm and the connection between the second arm and the third arm. More preferably, the support arm is moveably connected directly to the connection between the second arm and the third arm. In one preferred embodiment, the support arm is slideably linked to the connection between the second arm and the third arm. In particular, the support arm may be slideably linked to the connection between the second arm and the third arm, whereby the connection between the second arm and the third arm is moveable longitudinally with respect to the support arm. The relative longitudinal movement may be along a line parallel with the longitudinal axis of the support arm or along the support arm itself in a longitudinal direction. For example, the support arm may be provided with or have mounted thereto a guide, such as a guide channel, along which the connection between the second arm and the third arm is free to move.

Preferably, in this embodiment, the connection between the second arm and the third arm is pivotably connected to the support arm and moves along the support arm, more preferably along the longitudinal axis of the support arm. For example, the connection between the second arm and the third arm may be pivotably connected to the first position on the support arm, such as by means of a pin, spindle or axle, and the connection between the second arm and the third arm is moveable along a slot in the support arm.

In an alternative embodiment, the connection between the second arm and the third arm is fixed relative to the support arm and the support arm is pivotably connected at the first position on the support arm to the second position on the second arm and the first position on the third arm. The pivotable connection may be of any suitable form, preferably a pin, spindle or axle passing through the arms about which the arms are free to move.

In addition, the support arm is linked to the pivotable connection between the first arm and the first connecting arm. In this respect, the term 'linked' is a reference to a connection between the support arm and the connection between the first arm and the first connecting arm. In particular, the term 'linked' refers to a first type of connection in which the connection between the first arm and the first connecting arm is fixed in relation to the support arm. The term 'linked' also refers to a second type of connection, in which the connection between the first arm and the first connecting arm is moveable relative to the support arm as the assembly moves between the retracted and extended positions, whereby the movement of the support arm about the pivotable connection between the second arm and the third arm is constrained and controlled by the connection between the support and the connection between the first arm and the first connecting arm. In particular, movement of the connection between the first arm and the first connecting arm causes the support arm to move and pivot about the connection with the second and third arms.

In one embodiment, in which the connection between the first arm and the first connecting arm is moveable, the support arm is linked to the connection between the first arm and the first connecting arm such that the first arm and the first connecting arm both pivot in relation to the support arm and the connection moves along a straight line parallel to the longitudinal axis of the support arm. The support arm may be linked to the connection between the first arm and the first connecting arm by a linkage assembly, for example comprising one or more arms or levers, pivotably connected to the support arm and the connection between the first arm and the first connecting arm. More preferably, the support arm is moveably connected directly to the connection between the first arm and the first connecting arm. In one preferred embodiment, the support arm is slideably linked to the connection between the first arm and the first connecting arm. In particular, the support arm may be slideably linked to the connection between the first arm and the first connecting arm, whereby the connection between the first arm and the first connecting arm is moveable longitudinally with respect to the support arm. The relative longitudinal movement may be along a line parallel with the longitudinal axis of the support arm or along the support arm itself in a longitudinal direction. For example, the support arm may be provided with or have mounted thereto a guide, such as a guide channel, along which the connection between the first arm and the first connecting arm is free to move.

Preferably, in this embodiment, the connection between the first arm and the first connecting arm is pivotably connected to the support arm and moves along the support arm, more preferably along the longitudinal axis of the support arm. For example, the connection between the first arm and the first connecting arm may be pivotably connected to the second position on the support arm, such as by means of a pin, spindle or axle, and the connection between the first arm and the first connecting arm is moveable along a slot in the support arm.

In an alternative embodiment, the connection between the first arm and the first connecting arm is fixed relative to the support arm and the support arm is pivotably connected at the second position on the support arm to the second position on the first arm and the first position on the first connecting arm. The pivotable connection may be of any suitable form, preferably a pin, spindle or axle passing through the arms about which the arms are free to move.

In one preferred embodiment, the connection between the second arm and the third arm is fixed relative to the support arm and the connection between the first arm and the first connecting arm is moveable relative to the support arm, in particular along a line on or parallel to the support arm.

The support arm may consist of a single arm component. Alternatively, the support arm may comprise two or more arm components. In one embodiment, the two or more arm components are moveable longitudinally with respect to each other. In this way, the arm components may be moved longitudinally to increase the length of the support arm as the assembly is moved to the extended position. In one preferred arrangement, the two or more arm components are arranged telescopically, with the two or more arm components being moveable between a retracted condition and an extended position.

In one preferred embodiment, the support arm comprises a first support arm component and a second support arm component, the second support arm component being moveable longitudinally with respect to the first support arm component. The assembly further comprises a drive assembly, for moving the second support arm component longitudinally relative to the first support arm component.

In one preferred arrangement, the drive assembly comprises a drive arm pivotably connected to the second support arm. The drive arm may be pivotably connected to another component of the assembly, for example an arm of the assembly or, more preferably, to one of the first or second fixed pivots.

In one embodiment, the drive arm is pivotably connected to the second fixed pivot. In this way, with the second fixed pivot disposed below the first fixed pivot, the support arm may function as a leg, which extends downwards as the assembly is moved to the extended position, for example to engage with the ground or another structure, to provide support in the extended position.

As noted above, the support arm is deployed as the assembly moves from the retracted position to the extended position. The position and orientation of the support arm in the extended position are determined by the arrangement of the other arms of the assembly, in particular the relative positions of the connection between the second arm and the third arm and the connection between the first arm and the first connecting arm.

In one particularly preferred embodiment, with the assembly in the extended position, the support arm extends parallel to the line extending between the first and second fixed pivots.

The assembly of the present invention may comprise a fourth arm pivotably connected at a first position thereon to the first arm at a fourth position on the first arm. The fourth arm is adapted to connect at a second position thereon to a component to be moved.

The fourth arm may have any shape and configuration. A preferred form for the fourth arm is an elongate member, for example a bar or a rod.

The fourth arm is pivotably mounted at a first position on the fourth arm to the first arm at a fourth position on the first arm. The pivotable connection between the first and fourth arms may be of any suitable form, preferably a pin, spindle or axle passing through the arms about which one or both of the arms are free to move.

The fourth arm is pivotably connected to the first arm at a first position on the fourth arm and a fourth position on the first arm. The first position may be in any suitable location on the fourth arm. In one preferred embodiment, the first position is at or adjacent one end of the fourth arm, in particular the end of the fourth arm that is proximal to the first and second fixed pivots.

The fourth position on the first arm is spaced apart from the first position on the first arm. In one preferred embodiment, the fourth position on the first arm is at or adjacent the second end of the first arm, that is the end distal of the first fixed pivot.

In one preferred embodiment, the fourth position on the first arm coincides with the second position on the first arm, whereby the fourth arm is pivotably connected to both the first arm and the first connecting arm.

The fourth arm may be a driven arm, that is moved under the action of movement of the first and second arms. In this case, rotation of the first arm about the first fixed pivot causes the fourth arm to move. Alternatively, the fourth arm may be a driving arm, that is have a force applied thereto resulting in movement of the fourth arm, which in turn drives the other components of the assembly to result in movement of the first arm about the first fixed pivot and the second arm about the second fixed pivot.

The fourth arm is also connected to the object to be moved relative to the first and second fixed pivots. The connection between the fourth arm and the object is preferably in the region of, more preferably at, the end of the fourth arm that is distal of the first and second fixed pivots. It has been found that when the fourth arm is connected to the object to be moved there is a position on the fourth arm that moves in a substantially straight line, corresponding to the movement of the said point on the third arm. The connection between the fourth arm and the object is preferably in the region of, more preferably at, this position on the fourth arm.

The distance between the first and second fixed pivots and the lengths of the first, second, third and fourth arms may be selected according to the desired movement of the components to be achieved and the particular application of the assembly.

Taking the length of the fourth arm to be the distance between the first position on the fourth arm and the point on the fourth arm that moves in a straight line (preferably the position on fourth arm at which the fourth arm is connected to the object to be moved), the length of the fourth arm will be determined by the arrangement of the first and second arms, together with the connecting arms. In some embodiments, the length of the fourth arm is less than that of the first and second arms, in particular from 0.9 to 0.99 of the length of the first and/or second arms. For example, with the first and second arms being of equal length and less than the distance between the first and second fixed pivots, the fourth arm has a length of about 0.975 of the length of the first and second arms. In alternative embodiments, the length of the fourth arm is the same as that of the first arm and/or the second arm. Preferably, the fourth arm is equal in length to the third arm.

In one particularly preferred arrangement, the first, second, third and fourth arms are the same length.

Relative movement of the components of the assembly may be limited or restricted. Suitable means for limiting the relative movement of components of the assembly include a flexible tie or tether extending between two of the arms and connecting arms. In one embodiment, a flexible tie or tether extends between the first arm and the third arm, in particular between a point on the first arm between the first and third positions thereon and the first position on the third arm. One preferred form for the flexible tie comprises a plurality of hingedly connected arms or arm assemblies moveable between a folded condition when the assembly is in the retracted position and a fully extended condition in the extended position.

Alternatively, the movement of the assembly may be limited by components to which one or more arms of the assembly are connected. For example, the assembly may have an arm, for example the third arm, connected to a foldable assembly, which unfolds as the assembly moves from the retracted to the extended position. The foldable assembly may lock in the unfolded state, thereby locking the assembly in the extended position.

In one embodiment, the assembly is connected to a foldable assembly comprising a plurality of hingedly attached components, such as two hingedly attached components. For example, the foldable assembly may extend between a fixed point, for example the second fixed pivot, and the third arm, in particular the said point on the third arm. Advantageously, the foldable assembly may be linked to the support arm. In particular, the hinged connection between two of the components can be linked to the support arm. A suitable linkage includes a pivotably mounted arm extending between the support arm and the hinged connection. The support arm may be provided with a guide along which the linkage moves. In one embodiment, the foldable assembly is a floor assembly of a building comprising two or more floor panels.

Depending upon the arrangement of the assembly, the foldable assembly may lock when the assembly is in the extended position, that is the assembly can no longer be retracted simply by reversing the direction of action of the force or forces applied to the driven arm of the assembly. This has the advantage of providing the extended assembly with increased rigidity and strength. To reverse the movement of the assembly, a reverse drive assembly may be provided. The reverse drive assembly is connected to one or more components of the foldable assembly and is operated to move the foldable assembly from the locked position, thereby allowing the assembly to be moved to the retracted position. In one embodiment, the reverse drive assembly comprises a cable connected to a component of the foldable assembly. The cable may extend over one or more pulleys arranged on the assembly, to allow the cable to be pulled by a suitable winch.

In a particularly preferred embodiment of the assembly of the present invention, the lengths of the first, second and third arms, the fourth arm if present, and first and second connecting arms and the support arm are selected in accordance with the above criteria and to fold up when in the retracted position to lie between the first and second fixed pivots. It is a particular advantage that the assembly can be arranged to be in such a compact form when in the retracted position. In a preferred embodiment, one or more of the first, second and third arms and first and second connecting arms and the support arm are formed with portions having 'I' and 'L' shapes in cross-section, with the portions being arranged to allow the arms to be accommodated within one another when in the retracted position.

It is a further advantage of the assembly of present invention that it is highly scaleable and may be constructed and applied at a wide range of scales to convert motion, as described hereinbefore.

The assembly finds wide applications and uses, in particular by allowing relative movement between a first component and a second component.

Accordingly, in a further aspect, the present invention provides an assembly comprising a first component and a second component, the first component being arranged for movement with respect to the second component, wherein an assembly as hereinbefore described is provided between the first component and second component, operation of the assembly providing movement of the first component with respect to the second component.

One of the first and second components is connected to the third arm of the assembly. The other of the first and second components provides the first and second fixed pivot points to which the first and second arms are pivotally connected. In this way, movement of the first component with respect to the second component is effected. As noted above, such relative movement may be effected by applying a force to any of the first, second, third or fourth arms of the assembly.

The assembly comprising the first and second components finds extensive use in providing relative movement between two components. For example, the assembly finds use in moving a first component connected to either of the first or second arms and rotating about the respective first or second fixed pivot and a second component connected to the said point on the third arm, and the said point on the fourth arm if present, and moveable in a linear motion between the retracted and extended positions. At the same time, the assembly deploys the support arm, which may be used to support one or more components or to support the assembly and one or both of the first and second components, for example by acting as a leg.

In many applications, a plurality of assemblies is employed. In particular, a plurality of assemblies may be employed in a spaced apart relationship on opposing sides of an object to be moved. For example, a first and second assembly may be provided on opposing sides of an object to be moved with the third arms of two assemblies connected to opposing sides of the object.

Applications of the assembly of the present invention to convert rotational motion to linear motion include the support and movement of building structures relative to one another.

Accordingly, the present invention further provides a building comprising:

a first building portion and a second building portion, the first building portion being moveable relative to the second building portion between a retracted position and an extended position;

wherein relative movement between the first and the second building portions and support of one of the first and second building portions with respect to the other of the first and second building portions are provided by an assembly as hereinbefore described.

The first building portion may be any structure or part of a building, in particular a fixed structure, such as a house, apartment or office building, or a mobile building structure, such as a mobile house, caravan or the like. The second building structure may be any structure or component of the installation that is required to be moved relative to the first building portion between the retracted and extended positions. Examples of such structures include walls, wall panels, balconies, floors, floor panels, floor extensions, roofs, roof panels, roof extensions, canopies and the like.

Embodiments of the assembly of the present invention will be described, by way of example only, by reference to the accompanying figures, in which:

FIG. 5 shows an alternative embodiment to the assembly of FIGS. 4a and 4b;

FIG. 6 shows a further embodiment of an assembly according to the present invention in an extended position;

Figure 1:
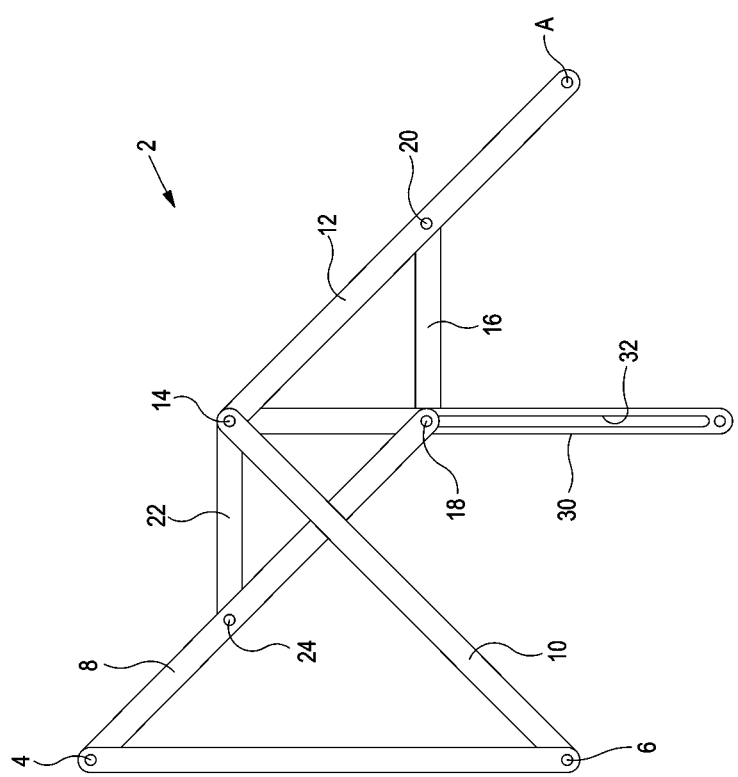
FIG. 1 shows a simplified diagrammatical representation of an assembly according to one embodiment of the present invention in an extended position.

Turning to FIG. 1, there is shown a diagrammatical representation of an assembly of one embodiment of the present invention, generally indicated as 2. The assembly 2 is shown mounted to a fixed structure at a first fixed pivot 4 and a second fixed pivot 6. The fixed pivots 4, 6 are spaced apart and are fixed in relation to one another. The fixed structure in FIG. 1 is represented by a fixed bar extending between the fixed pivots 4, 6. However, it is to be understood that the fixed structure may be any structure, assembly or component, such as a building or building component and the like.

A first arm 8 is pivotally connected at a first position at one end of the first arm to the first fixed pivot 4. A second arm 10 is pivotally connected at a first position at one end of the second arm to the second fixed pivot 6. A third arm 12 is mounted at one end by a pivot connection 14 at the second or distal end of the second arm 10.

A first connecting arm 16 is mounted at one end by a pivot connection 18 at the second end of the first arm 8. The second end of the first connecting arm is mounted by a pivot connection 20 to the third arm at a position spaced from the pivot connection 14.

A second connecting arm 22 is mounted at one end by a pivot connection 24 to the first arm at a position spaced from and between both the fixed pivot 4 and the connection 18. The second end of the second connecting arm 22 is mounted by a pivot connection to the second arm 10 at a position spaced from the second fixed pivot 6. In the embodiment shown in FIG. 1, the second connecting arm 22 is connected to the second arm at the connection 14, such that the second connecting arm 22 is also connected to the third arm 12. This is a preferred arrangement. However, the second connecting arm 22 may be pivotably connected to the second arm 10 at a position spaced from the connection 14 and between the fixed pivot 6 and the connection 14.

The pivot connections may be formed by any suitable means, for example by pins extending through holes in the arms being pivotally joined.

Movement of the first arm 8 about the first fixed pivot 4 and the second arm 10 about the second fixed pivot 6 causes the third arm 12 to move such that a point A on the third arm moves between a retracted position and an extended position. In moving between the retracted and extended positions, the point A describes a substantially straight line. This straight line extends perpendicular to the line joining the first and second fixed pivots 4 and 6.

The assembly 2 of FIG. 1 further comprises a support arm 30. The support arm 30 is pivotally connected to the connection 14 between the second arm 10 and the third arm 12. In the embodiment shown, the support arm 30 is also pivotally connected to the second connecting arm 22.

The support arm 30 extends from the connection 14 towards and beyond the connection 18 between the first arm 8 and the first connecting arm 16. The support arm 30 is linked to the connection 18, such that the movement of the support arm 30 about the connection 14 is constrained by the movement of the connection 18, as the assembly moves between the retracted and extended positions. In the extended position shown in FIG. 1, the support arm 30 extends parallel to the line joining the fixed pivots 4 and 6.

As noted above, the support arm 30 is linked to the connection 18 between the first arm and the first connecting arm 16. In the embodiment shown, the support arm 30 is provided with a guide channel 32 extending longitudinally along a major portion of the length of the support arm. In the arrangement shown, the first arm 8 is arranged on one side of the support arm 30 and the first connecting arm 16 is arranged on the opposite side of the support arm 30, with the pin of the connection 18 extending through the channel 32.

In operation, as the assembly 2 moves between the retracted and extended positions, the connection 18 moves along the guide channel 32, in turn moving the support arm 30 about the connection 14.

Figure 2A:
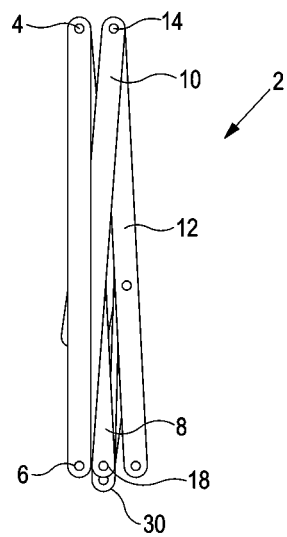
FIGS. 2a to 2d show the assembly of FIG. 1 in positions between a retracted position shown in FIG. 2a and a partially extended position shown in FIG. 2d.
Figure 2B:
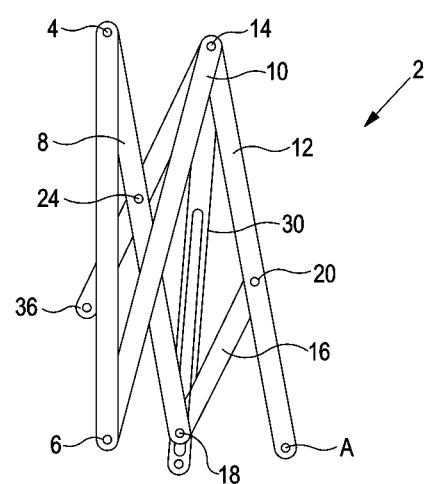
Figure 2C:
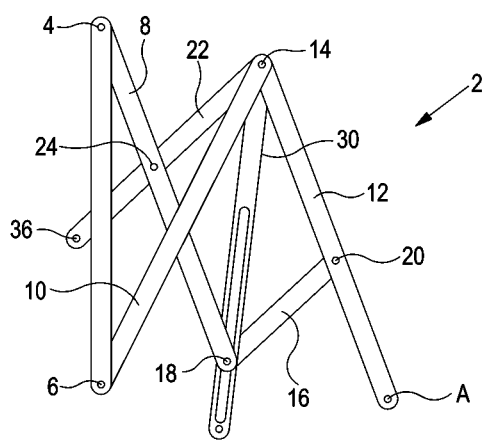
Figure 2D:
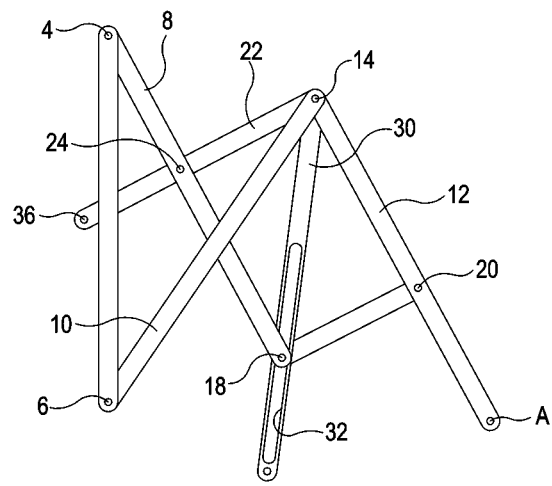

Turning now to FIGS. 2a to 2d, there is shown a sequence of drawings of the general assembly of FIG. 1 in positions between a retracted position, shown in FIG. 2a, and a partially extended position shown in FIG. 2d. The components of the assembly of FIGS. 2a to 2d have been identified using the same reference numerals as used in relation to FIG. 1 and discussed above.

In the assembly shown in FIGS. 2a to 2d, the second connecting arm 22 extends beyond the connection 24 with the first arm. This allows the proximal end 36 of the second connecting arm 22 to engage with a stop or locking mechanism (not shown for clarity) when in the extended position, to provide additional rigidity and strength to the assembly 2.

As can be seen, as the assembly 2 moves from the retracted position shown in FIG. 2a through the positions shown in FIGS. 2b to 2d to the extended position shown in FIG. 1, the connection 18 moves upwards (as viewed in the figures) along the channel 32 in the support arm 30, as the support arm 30 rotates about the connection 14 and descends (as viewed in the figures). In particular, the free end of the support arm 30 moves down and below (as viewed in the figures) the straight line between the fixed pivot 6 and the point A on the third arm 12.

Figure 3:
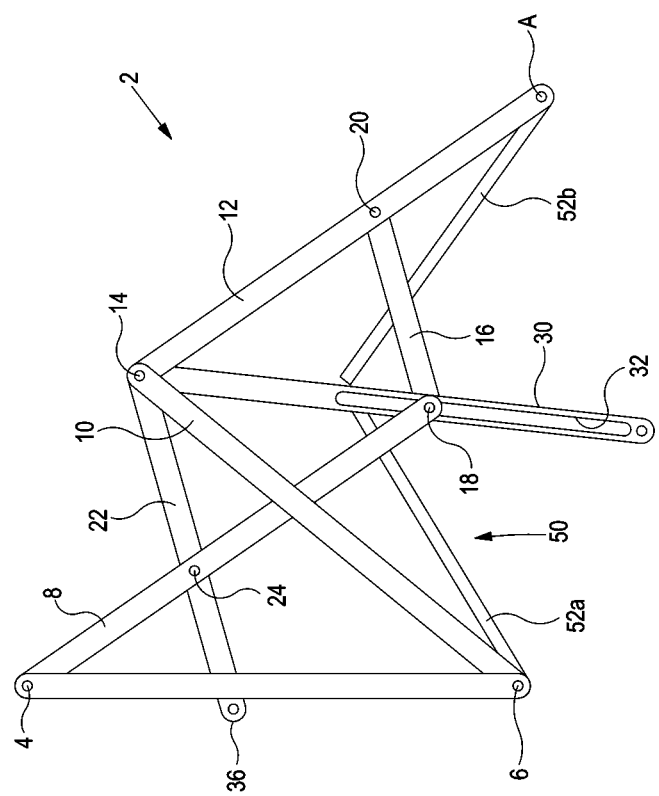
FIG. 3 shows a second embodiment of the assembly of the present invention.

Turning to FIG. 3, there is shown a further embodiment of the assembly of the present invention. The assembly shares many components with the assembly of FIGS. 1 and 2, as described above, which have been indicated using the same reference numerals.

In the embodiment of FIG. 3, the assembly 2 is supporting a floor assembly 50, such as may be employed with an expandable building structure. The floor assembly 50 extends between and is connected to each of the second fixed pivot 6 and the point A on the third arm 12. The floor assembly 50 comprises two hingedly connected floor members 52a, 52b, with the first floor member 52a pivotably connected to the second fixed pivot 6 and the second floor member 52b pivotably connected to the point A on the third arm 12.

The assembly 2 is shown in FIG. 3 in a partially extended position. As can be seen, the floor members 52a, 52b are unfolded and moved downwards (as viewed in the figure) into a horizontal position, as the assembly is moved towards the extended position.

It is to be understood that the floor assembly 50 in the arrangement of FIG. 3 may be replaced by other components, mounted in a corresponding manner, which may also be moved and supported by the assembly 2 in like manner.

Figure 4A:
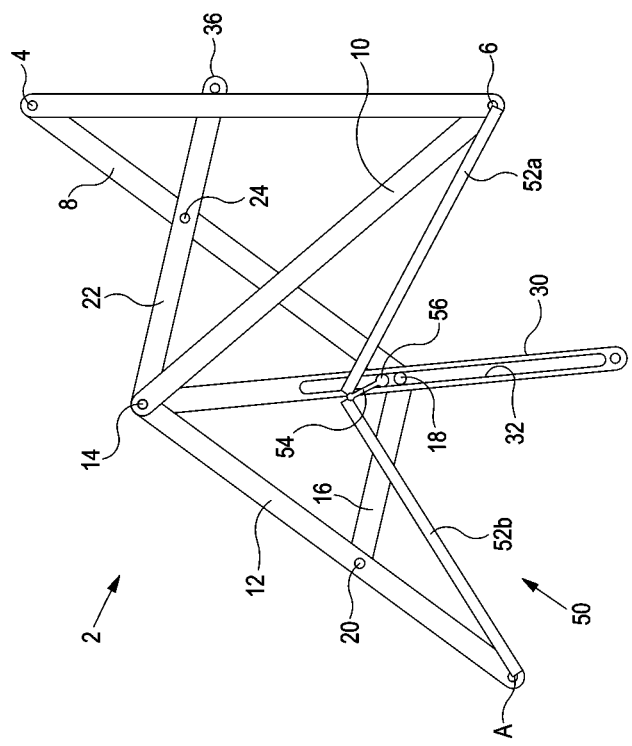
FIGS. 4a and 4b show an alternative embodiment to the assembly of FIG. 3 in a partially extended and extended position.
Figure 4B:
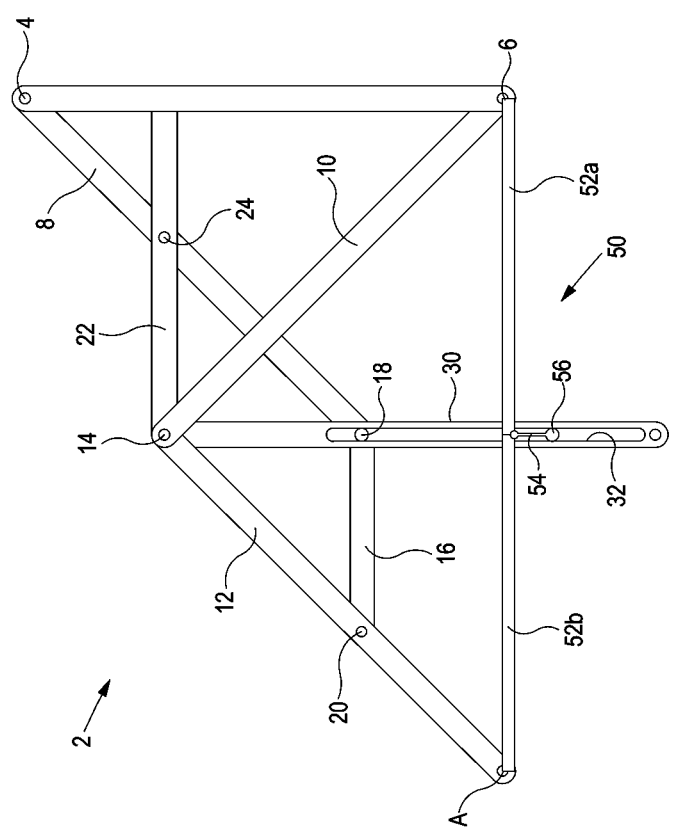

Turning to FIGS. 4a and 4b, there is shown an alternative embodiment to the arrangement of FIG. 3. Components common to the arrangements of FIGS. 3 and 4 are indicated using the same reference numerals, as described above.

In the embodiment of FIGS. 4a and 4b, the floor assembly 50 is provided with additional support by the support arm 30. In particular, the hinged connection between the floor members 52a, 52b is linked by a short arm 54 to a pin 56 slidably mounted in the guide channel 32 of the support arm. The arm 54 is pivotable about the pin 56.

In operation, the floor members 52a, 52b are moved downwards (as viewed in the figures) and supported by the support arm 30. In the fully extended position, the floor members 52a, 52b are supported by the support arm 30, as shown in FIG. 4b. In this respect, it is to be noted that, unlike the connection 18, the path taken by the hinged connection between the floor members 52a, 52b when moving is not a straight line, but is rather a curved path, hence the need for the arm 54 and the pin 56. As an alternative to the arm 54 and the pin 56, an appropriately curved guide channel may be provided, for example in or attached to the support arm 30, along which the connection between the floor members 52a, 52b can move.

Referring now to FIG. 5, there is shown a modification to the general assembly shown in FIGS. 4a and 4b. Components common to the assemblies of FIGS. 4a, 4b and FIG. 5 are indicated using the same reference numerals and are as described above.

In the assembly shown in FIGS. 4a and 4b, the floor assembly 50 locks in the extended position shown in FIG. 4b. This action of locking helps to provide the entire assembly with rigidity in the extended position. However, when locked in this position, applying a force to the arms of the assembly, such as the third arm, in the direction of the fixed pivots 4, 6 is not effective in unlocking the floor assembly 50, which remains in the horizontal position shown in FIG. 4b and prevents the entire assembly being returned to the retracted position. In the embodiment shown in FIG. 5, means are provided to unlock the floor assembly 50.

In particular, the assembly shown in FIG. 5 comprises a cable 60. The cable 60 is attached at one end to the pin 56. In the arrangement shown, the cable 60 runs around pulleys provided at the connection 14 and at the position A on the third arm 12.

In operation, with the assembly in the extended position shown in FIG. 4b, pulling the cable 60 in the direction of the arrows indicated in FIG. 5 raises the pin 56 and moves the pin upwards in the guide channel 32, in turn unlocking the floor assembly 50 and raising the floor members 52a, 52b, as viewed in the figure.

Turning now to FIG. 6, there is shown an alternative embodiment of an assembly of the present invention. The assembly of FIG. 6 shares many components with the assembly of FIG. 1, which are indicated using the same reference numerals and are as described above.

The assembly of FIG. 6 further comprises a fourth arm 70 pivotably connected at one end of the arm to the connection 18 between the first arm 8 and the first connecting arm 16. The fourth arm 70 has a point B thereon. As with point A on the third arm 12, in moving between the retracted and extended positions, the point B describes a substantially straight line. This straight line extends perpendicular to the line joining the first and second fixed pivots 4 and 6.

In the arrangement shown in FIG. 6, a component to be moved is pivotably connected to points A and B on the third and fourth arms 12, 70. This component is represented by a bar extending between the points A and B. However, it is to be understood that this component may be any component, assembly or structure that is to be moved relative to the fixed pivots 4 and 6.

In the assembly of FIG. 6, the second connecting arm 22 extends beyond the connection 24, as described above and shown in the assembly of FIG. 2. first connecting arm 16 extends beyond the connection 20, in an analogous manner to the extended second connecting arm.

Figure 7A:
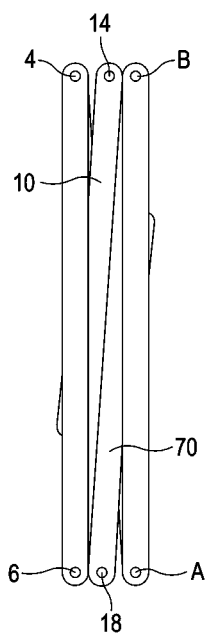
FIGS. 7a to 7d show the assembly of FIG. 6 in positions between a retracted position shown in FIG. 7a and a partially extended position shown in FIG. 7d.
Figure 7B:
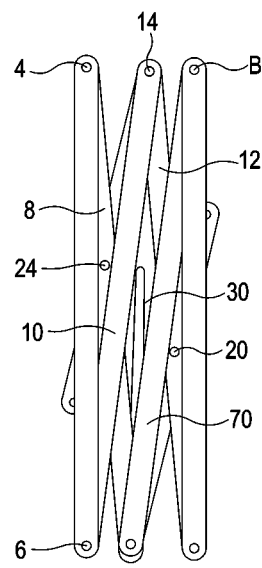
Figure 7C:
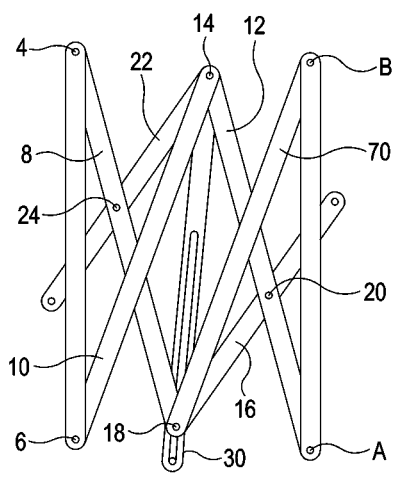
Figure 7D:
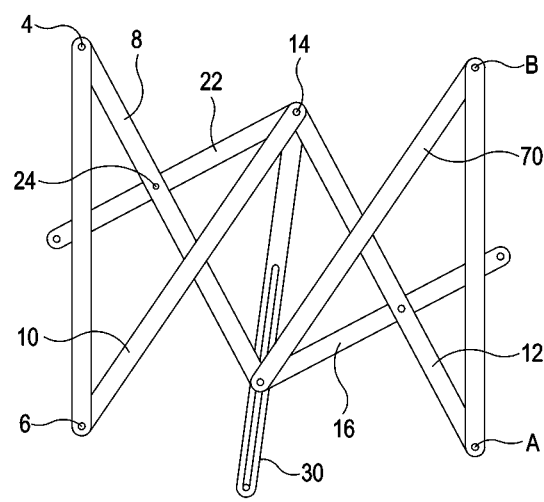

Referring to FIGS. 7a to 7d, there is shown a sequence of drawings of the general assembly of FIG. 7 in positions between a retracted position, shown in FIG. 7a, and a partially extended position shown in FIG. 7d. The components of the assembly of FIGS. 7a to 7d have been identified using the same reference numerals as used in relation to FIG. 6 and discussed above.

Figure 8:
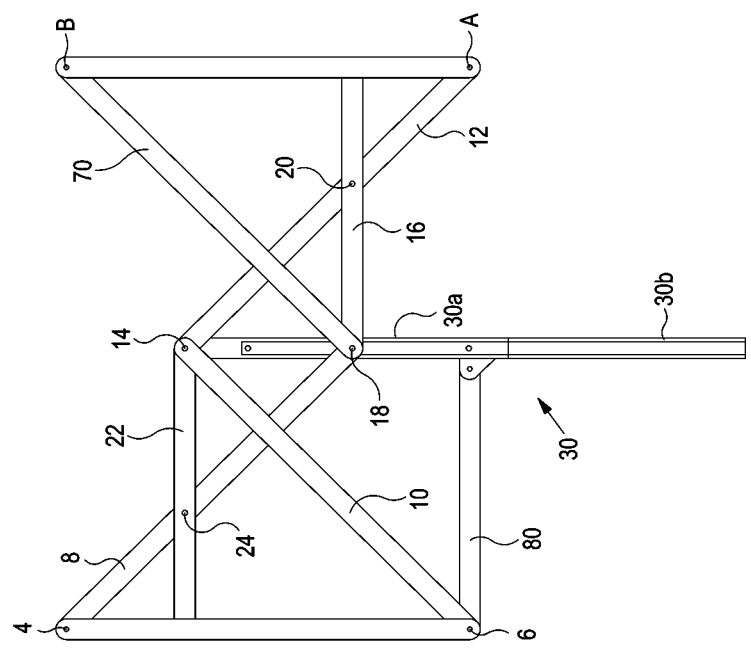
FIG. 8 shows a further embodiment of an assembly according to the present invention in an extended position.
Figure 9A:
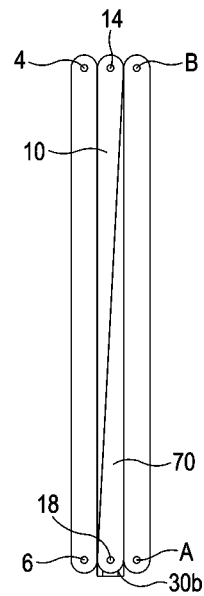
FIGS. 9a to 9d show the assembly of FIG. 8 in positions between a retracted position shown in FIG. 9a and a partially extended position shown in FIG. 9d.
Figure 9B:
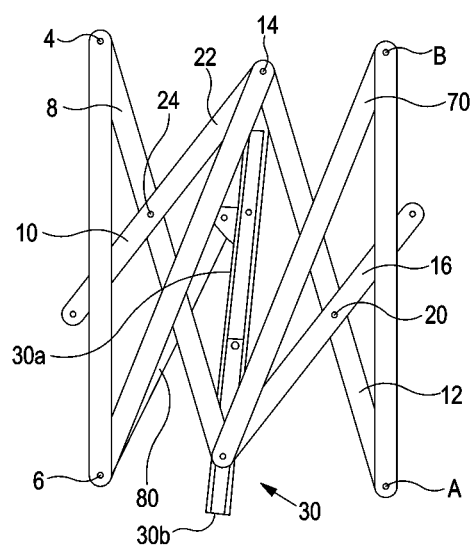
Figure 9C:
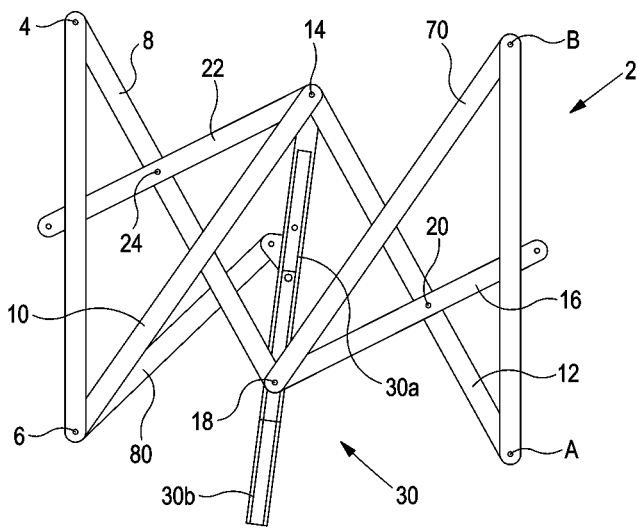
Figure 9D:
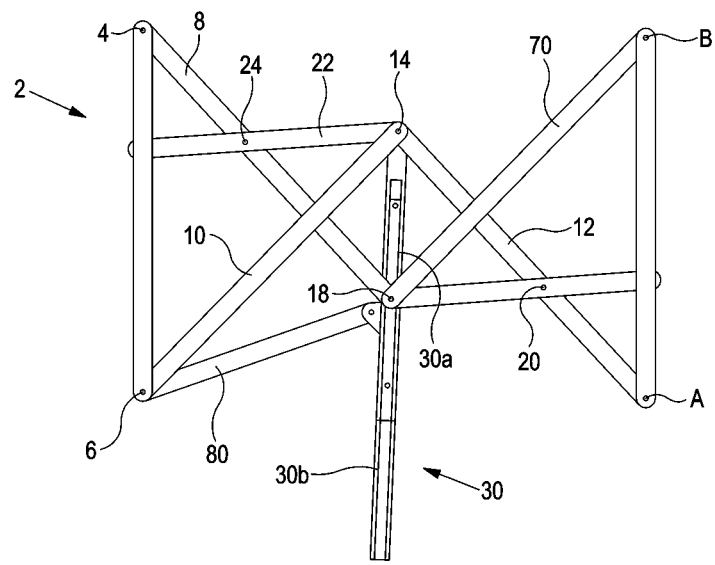

Turning now to FIG. 8, there is shown an alternative embodiment of an assembly of the present invention. The assembly of FIG. 8 shares many components with the assembly of FIG. 6, which are indicated using the same reference numerals and are as described above. The general configuration and operation of the assembly of FIG. 8 are as described above with reference to FIG. 6 and FIGS. 7a to 7d.

The assembly of FIG. 8 differs from the assembly of FIG. 6 in that the support arm 30 comprises a first support arm component 30a and a second support arm component 30b. The first and second support arm components 30a and 30b are slideably arranged, whereby the second support arm component 30b moves longitudinally with respect to the first support arm component 30a. More particularly, the second support arm component 30b is slideably mounted to the first support arm component 30a and is moveable therealong. In this way, the length of the support arm 30 varies as the assembly moves between the retracted position and the extended position, as can be seen in FIGS. 7a to 7d.

A drive arm 80 is pivotably mounted at one end to the second fixed pivot 6 and is pivotably mounted at the second end to the second support arm component 30b.

The movement of the drive arm 80 and the second support arm component 30b can be seen in FIGS. 9a to 9d. In particular, as the assembly moves from the retracted position, shown in FIG. 9a, to the extended position, shown in FIG. 8, the drive arm 90 moves the second support arm component 30b along the first support arm component 30a, thereby extending the length of the support arm 30.

When the assembly is orientated as shown in FIG. 8 and FIGS. 9a to 9d, with the first fixed pivot 4 vertically above the second fixed pivot 6, the support arm 30 extends in an downwards direction. When in the extended position, shown in FIG. 8, the lower end of the second support arm component 30b may contact a structure or the ground, to support the assembly. In this way, the support arm 30 can function as a leg that may be extended and retracted, as the assembly moves between the retracted and extended positions.

In the embodiments shown in the figures and described above, the connection between the second arm and the third arm is fixed relative to the support arm, while the connection between the first arm and the first connecting arm is moveable with respect to the support arm. In these embodiments, the support arm is moved and/or extended downwards, as viewed in the figures. The assembly may be constructed and operated in an analogous manner by having the connection between the first arm and the first connecting arm fixed relative to the support arm, while the connection between the second arm and the third arm is moveable with respect to the support arm. In this arrangement, the support arm moves and/or extends in the opposite direction to that shown in the accompanying figures.

The invention claimed is:

1. An assembly for converting motion, the assembly comprising:
   a first arm rotatable at a first position thereon about a first fixed pivot;
   a second arm rotatable at a first position thereon about a second fixed pivot, the second fixed pivot spaced apart from the first fixed pivot;
   a third arm pivotably connected at a first position thereon to the second arm at a second position on the second arm, the second position spaced apart from the first position on the second arm;
   a first connecting arm extending between the first arm and the third arm, the first connecting arm pivotably connected to a second position on the first arm spaced apart from the first position and pivotably connected to the third arm at a second position thereon spaced apart from the first position thereon;
   a second connecting arm extending between the first arm and the second arm, the second connecting arm pivotably connected to a third position on the first arm disposed between the first and second positions thereon and pivotably connected to a third position on the second arm;
   a support arm linked to the pivotable connection between the second arm and the third arm and extending from the pivotable connection between the second arm and the third arm, the support arm being linked to the pivotable connection between the first arm and the first connecting arm, wherein one of the pivotable connection between the second arm and the third arm and the pivotable connection between the first arm and the first connecting arm is moveable relative to the support arm and the other of the pivotable connection between the second arm and the third arm and the pivotable connection between the first arm and the first connecting arm is fixed relative to the support arm.

2. The assembly according to claim 1, wherein the first and second fixed pivots are arranged on a vertical straight line.

3. The assembly according to claim 1, wherein the arms of the assembly are arranged to lie and move to one side of the line joining the first and second fixed pivots.

4. The assembly according to claim 1, wherein the moveable one of the pivotable connection between the second arm and the third arm and the pivotable connection between the first arm and the first connecting arm both pivot in relation to the support arm and move along a straight line parallel to the longitudinal axis of the support arm.

5. The assembly according to claim 4, wherein the moveable one of the pivotable connection between the second arm and the third arm and the pivotable connection between the first arm and the first connecting arm move along the longitudinal axis of the support arm.

6. The assembly according to claim 1, further comprising a guide connected to the support arm and with which the moveable one of the pivotable connection between the second arm and the third arm and the pivotable connection between the first arm and the first connecting arm is engaged and moves along as the assembly moves between the retracted and extended positions.

7. The assembly according to claim 6, wherein the guide comprises a guide channel, preferably a guide channel extending longitudinally along the third arm.

8. The assembly according to claim 1, wherein the longitudinal axis of the support arm is substantially parallel to the line joining the first and second fixed pivots in the extended position.

9. The assembly according to claim 1, wherein the first connecting arm and/or the second connecting arm extends beyond the connection with the first arm towards the line joining the first and second fixed pivots, wherein the end of the first connecting arm and/or the second connecting arm is arranged to engage with the structure providing the first and second fixed pivots.

10. The assembly according to claim 1, wherein the length of the support arm increases as the assembly moves from the retracted position to the extended position.

11. The assembly according to claim 1, further comprising a fourth arm, the fourth arm pivotably connected at a first position on the fourth arm to a fourth position on the first arm.

12. The assembly according to claim 11, wherein the fourth position on the first arm coincides with the second position on the first arm.

13. The assembly according to claim 1, further comprising a foldable assembly to limit relative movement of the components of the assembly, wherein the foldable assembly comprises a plurality of hingedly connected arms or components.

14. The assembly according to claim 13, wherein the hingedly connected arms or components are connected by a hinged connection linked to the support arm and moveable along the support arm.

15. The assembly according to claim 13, wherein the hinged connection is engaged with and moves along a guide comprising a guide channel formed on or in the support arm.

16. The assembly according to claim 13, wherein the foldable assembly locks when the assembly is in the extended position.

17. The assembly according to claim 16, further comprises a reverse drive assembly connected to one or more arms or components of the foldable assembly.

18. An expandable assembly comprising a first component and a second component, the first component being arranged for movement with respect to the second component, wherein an assembly according to claim 1 is provided between the first component and second component, operation of the assembly providing movement of the first component with respect to the second component.

19. The expandable assembly according to claim 18, wherein the expandable assembly is a building and the first and second components are building components.

20. The expandable assembly according to claim 18, wherein the third arm of one or more of the assemblies forms a leg to support the second component in the extended position.

* * * * *